United States Patent
Eckfeldt

[15] 3,662,256
[45] May 9, 1972

[54] HYDROXYL ION MEASURING SYSTEM
[72] Inventor: Edgar L. Eckfeldt, Ambler, Pa.
[73] Assignee: Leeds & Northrup Company, Philadelphia, Pa.
[22] Filed: Apr. 27, 1970
[21] Appl. No.: 31,900

[52] U.S. Cl............................324/29, 324/30 R, 204/195 G
[51] Int. Cl.........................................................G01n 27/42
[58] Field of Search......................204/195 G; 324/29, 30 R

[56] References Cited

UNITED STATES PATENTS 3,405,048  10/1968  Soltz....................................324/30 X

OTHER PUBLICATIONS

Eckfeldt and Ott, Hydroxyl for Measurement with the Glass Electrode–Analysis Instrumentation, Vol. 7, pp. 66– 73, Jan. 9, 1970.

*Primary Examiner*—Michael J. Lynch
*Attorney*—William G. Miller, Jr. and Raymond F. MacKay

[57] ABSTRACT

A system for measuring the pOH value of a solution by subtracting a signal representing the pH value of the solution from a signal representing the value of the logarithm of the reciprocal of the ionization constant of water at the solution temperature. The circuit for providing the value of the logarithm utilizes a temperature sensitive resistive element having a positive temperature coefficient. That element is shunted by a fixed resistor and the shunt combination is in series with another fixed resistor and a source of fixed potential so that the current through the circuit is proportional to the value of the logarithm.

11 Claims, 4 Drawing Figures

PATENTED MAY 9 1972 3,662,256

INVENTOR·
EDGAR L. ECKFELDT

BY William G. Miller Jr.

AGENT

HYDROXYL ION MEASURING SYSTEM

BACKGROUND OF THE INVENTION

This invention relates to the measurement of the hydroxyl ion concentration in terms of pOH and more specifically relates to making a measurement of the pOH of an aqueous solution by utilizing a pH electrode measuring system and a temperature sensitive element for producing a signal capable of converting the pH measurement to a measurement of pOH.

The measurement of pOH as an indication of hydroxyl ion concentration is of importance in certain processes. Such a measurement would, for example, be useful in the carrying out of a selective hydroxide precipitation of a metal ion from a mixture of such ions, for that operation can be carried out by careful control of the hydroxyl ion concentration. The hydroxyl ion concentration is likewise of importance in boiler water treatment where corrosion control is achieved by maintaining a predetermined low hydroxyl ion content in the water.

Heretofore, the measurement of pH has been used as a means for measuring the hydroxyl ion concentration by utilizing the reciprocal relationship between hydroxyl ion concentration and hydrogen ion concentration which normally exists in an aqueous solution. Such systems for measuring the hydroxyl ion concentration have, however, been inadequate in that they have failed to take into account the fact that the relationship between the hydroxyl ion concentration and the hydrogen ion concentration varies with temperature.

In carrying out this invention there is provided a system for measuring the pOH value of an aqueous solution by subtracting a signal representative of the pH value of the solution from a signal which is produced in response to the temperature of the solution and which is representative of the value of the logarithm of the reciprocal of the ionization constant of water at the solution temperature. The subtraction of the signals then provides a signal representative of the pOH value of the solution.

It is an object of this invention to provide an improved means for measuring the pOH value of an aqueous solution.

It is a further object of this invention to provide a means for automatically measuring the pOH value of an aqueous solution taking into account the temperature of that solution.

BRIEF DESCRIPTION OF THE DRAWINGS

FIG. 3b is a variation of the circuit diagram of FIG. 3a.

DESCRIPTION OF THE PREFERRED EMBODIMENTS

Figure 1:
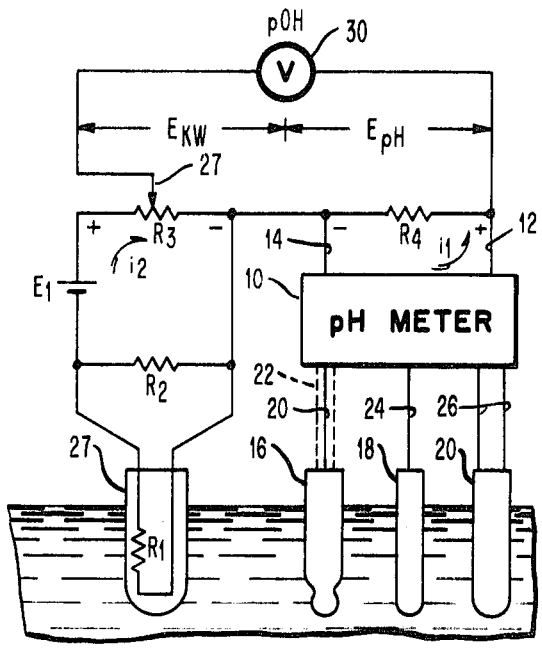
FIG. 1 is a circuit diagram of a pOH measuring system in which the signals combined to obtain an indication of pOH are voltages.

In aqueous solutions a very small portion of the water molecules dissociates to form hydroxyl and hydrogen ions:

$$H_2O = H^+ + OH^- \qquad (1)$$

The hydroxyl and hydrogen ion activities are quantitatively related by an equilibrium that is expressed by the equation:

$$K_w = (a_{H^+})(a_{OH^-}) \qquad (2)$$

where:
$K_w$ is the ionization constant of water, and
$a_{H^+}$ = hydrogen ion activity.
$a_{OH^-}$ = hydroxyl ion activity.

This equation is obeyed even when an acid or a base is added to the water, causing a very great increase in the activity of one of the ions. $K_w$ remains constant, however, only at constant temperature. There is a marked change in $K_w$ with changes in temperature as shown by the following table of values for the ionization content of water at several temperatures as empirically determined:

| temp °C | Log $1/K_w$ |
|---|---|
| 0 | 14.943 |
| 25 | 13.997 |
| 50 | 13.263 |
| 75 | 12.697 |
| 100 | 12.263 |

These values were derived from the work of H. S. Harned and R. A. Robinson as published in the Transactions of the Faraday Society 36,973 (1940). They established the following relationship from empirical data:

$$\Delta F° = 20454.96 - 27.8506T + 0.078050T^2 \qquad (3)$$

where:
$\Delta F°$ = standard state free energy change. and
$T$ = absolute temperature.

However, $$\Delta F° = -2.3026 \, RT \log K_w \qquad (4)$$

in which
$R$ = the gas constant expressed as calories per degree per mole,
$K_w$ = the ionization constant of water,
$T$ = absolute temperature in degrees Kelvin, and
2.3026 is the multiplier for converting from natural logs to base 10 logs.

Substituting eq. (4) in eq. (3) and transposing, and inserting values for the constants, $$\log(1/K_w) = (4472/T) - 6.0888 + 0.017064T \qquad (5)$$

Converting equation (2) to logarithmic form produces the following equation:

$$\log K_w = \log(a_{H^+}) + \log(a_{OH^-}) \qquad (6)$$

Changing the signs of both sides we then have:

$$-\log K_w = -\log(a_{H^+}) - \log(a_{OH^-}) \qquad (7)$$

Since negative logarithms of the activities represent respectively pH and pOH, equation (7) reduces to:

$$-\log K_w = pH + pOH \qquad (8)$$

or:

$$pOH = \log(1/K_w) - pH \qquad (9)$$

The resulting equation (9) shows the relationship between $K_w$, pH and pOH, namely that a signal proportional to pOH can be obtained by subtracting a signal representing pH from a signal representing the logarithm of $1/K_w$.

In FIG. 1 there is shown a circuit for providing a voltage representative of the pH of the solution being tested and a means for subtracting that voltage from another voltage which represents the logarithm of $1/K_w$ to provide a voltage proportional to the pOH of the solution.

In FIG. 1 the pH meter 10 produces through a resistor $R_4$ a current flow $I_1$ which is proportional to the pH of the sample solution as measured by the pH meter 10 so that there is produced across resistor $R_4$ a potential $E_{pH}$. The resistance value of $R_4$ is selected as may be necessary to scale the potential $E_{pH}$ to the potential range available for $E_{Kw}$ as mentioned below.

The pH meter 10 may be any of a number of standard pH meters presently available or it may more specifically be a pH meter of the type shown and described in U.S. Pat. No. 2,674,719, issued to A. J. Williams, Jr. on Apr. 6, 1954, wherein the leads 12 and 14 to the resistor $R_4$ corresponds to the conductors 36 and 40 of FIG. 1 of that patent with the resistor $R_4$ replacing meter 41.

The pH meter 10 can utilize a conventional pH glass electrode 16 in combination with a reference electrode 18 and a temperature compensating element 20 with the temperature compensating element 20 providing the necessary compensating for the pH measurement.

As shown in FIG. 1, glass electrode 16 is connected to pH meter 10 by a lead 20 which is shielded by the shield 22. Reference electrode 18 is connected to the pH meter 10 by lead 24 while the temperature compensating element 20 is connected to the meter 10 by the pair of leads 26.

In order to produce a signal, such as a voltage, representative of the value of the logarithm of $1/K_w$ at the temperature of the sample solution being measured, a temperature responsive resistive element $R_1$ is used. It preferably takes a form such that it can be immersed with its encasing body 27 into the sample solution, as shown in FIG. 1, so that the temperature of $R_1$ is always maintained as close as possible to the temperature of the sample solution. There is then provided a means for modifying the overall impedance characteristic of the series circuit which includes $R_1$ and a potential source $E_1$ so that the change in the impedance across $E_1$ and hence the change in the current through the impedance varies with a change in the temperature of the sample solution in accordance with the changes in the logarithm of the reciprocal of the ionization constant of water (log $1/K_w$). For this purpose a shunting resistive element $R_2$ is connected across the resistive element $R_1$ and the parallel combination of the resistive elements $R_1$ and $R_2$ are connected in series circuit with another resistive element $R_3$ to form the circuit establishing the impedance across $E_1$ so that the effective resistance of the parallel combination of resistive elements $R_1$ and $R_2$ in series with $R_3$ provides the necessary non-linear circuit for establishing a current $i_2$, representative of the logarithm of $1/K_w$.

The current $i_2$ in the series circuit is in the direction shown in FIG. 1 and as stated is of magnitude representative of the logarithm of $1/K_w$ as the temperature change of the sample solution is followed by the temperature of the resistive element $R_1$.

As a result of the flow of current $i_2$ through the resistive element $R_3$ shown as a potentiometer there is produced across the portion of $R_3$ tapped off by variable tap 27 a signal in the form of a potential $E_{Kw}$ representative of the value of the logarithm of the reciprocal of the ionization constant of water at the temperature of the sample solution. The use of the variable tap 27 makes possible the scaling of the potential $E_{Kw}$ to $E_{pH}$.

Figure 2:
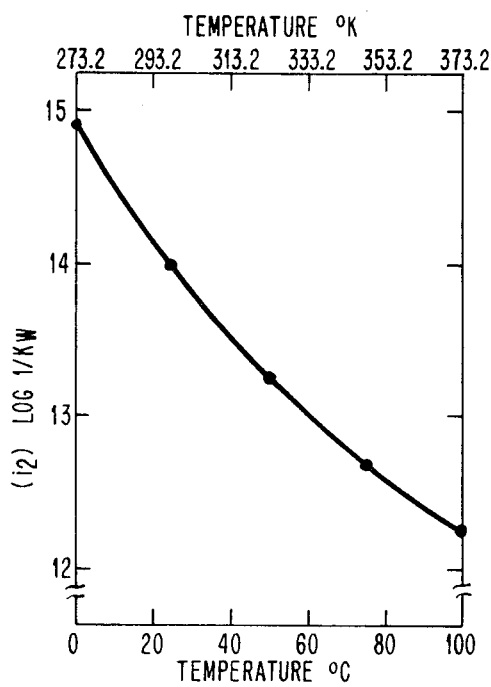
FIG. 2 is a graphical representation of the relationship between the logarithm of the reciprocal of the ionization constant of water and the temperature of the aqueous solution whose pOH is to be measured.

The respective resistance values of the resistive elements $R_1$, $R_2$, and $R_3$ should be such that with the existing temperature coefficient for $R_1$ and a particular potential $E_1$ there is provided a relationship between the logarithm of $1/K_w$, representative of the current $i_2$, and the sample solution temperature as shown in FIG. 2. It will be noted that the characteristic illustrated in FIG. 2 is a smooth curve which closely matches the empirical data of the table above which sets forth specific points relating the logarithm of $1/K_w$, as scaled along the ordinate, to the temperature, as scaled along the abscissa. The empirically determined points from the table are shown in FIG. 2 as plotted points.

If, for example, the temperature sensitive element $R_1$, which may be made of nickel wire, has a positive coefficient of 0.006 per degree Centigrade, its resistance value may be chosen so that at 0° C it has a resistance value which is 0.8 times that of the resistance of the element $R_2$ and the value of $R_3$ may be chosen to have a resistance 0.08 times that of the element $R_2$ to obtain the appropriate total resistance across $E_1$. It will, of course, be necessary to have resistive elements $R_1$, $R_2$, and $R_3$ with resistance values having a somewhat different relationship if the temperature coefficient of the element $R_1$ is other than 0.006 per degree Centigrade in order that the relationship between the current $i_2$ and the temperature of the solution can closely follow the curve of FIG. 2.

As shown in FIG. 1, the potential $E_{pH}$ is subtracted from the potential $E_{Kw}$ by virtue of their opposing polarities so that the voltmeter 30, measuring that difference, provides an indication of the pOH of the solution. The voltmeter 30 is preferably a high impedance electronic voltmeter and may be linearly scaled from 0–14 pOH. In order to electrically zero the voltmeter, a biasing potential may be inserted in series with it.

The system of FIG. 3 a, in which like reference characters indicate elements similar to those of FIG. 1, utilizes the current output $i_1$ of the pH meter 10 as a signal representative of the pH of the sample solution. The current $i_1$ flows from the positive lead 12 of the meter 10 to the negative lead 14 through ammeter 30a.

By including the ammeter 30a in the series circuit produced by the resistive elements $R_1$, $R_2$, and $R_3$ and the source $E_1$, the current $i_2$ of that series circuit is allowed to flow through the ammeter 30a in a direction opposite to the current $i_1$ so that the difference between the currents provides an indication on the ammeter 30a representative of the pOH of the sample solution. It should be noted that to obtain the proper direction of current flow for $i_2$, the polarity of the potential source $E_1$ in FIG. 3a is reversed with respect to the polarity in FIG. 1.

Figure 3A:
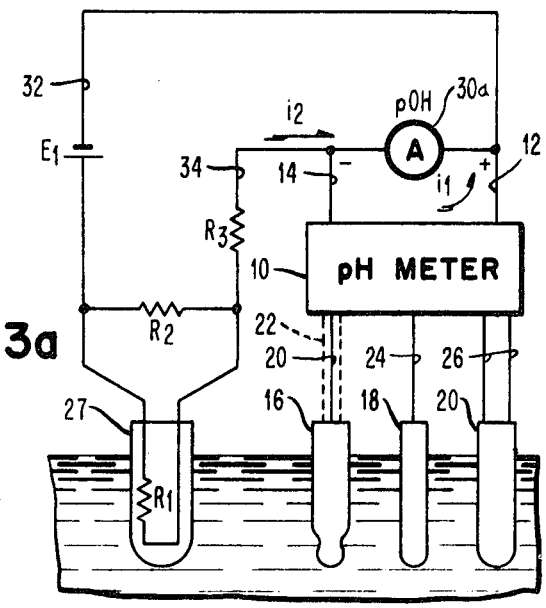
FIG. 3a is a circuit diagram of a system for measuring pOH in which the signals which are combined to obtain the measurement of pOH are currents.

Thus, FIG. 3a provides a measure of the pOH of the solution by subtracting the current signal $i_1$ from the current signal $i_2$ in the ammeter 30a, the current signal $i_1$ being representative of the pH of the solution, as measured by a standard pH meter, and the signal $i_2$ being representative of the logarithm of the reciprocal of the ionization constant of water at the particular solution temperature. It will be noted that the network including the resistive elements $R_1$, $R_2$, and $R_3$ and the potential source $E_1$ is similar to the comparable network of FIG. 1 except that the network is arranged to incorporate the ammeter 30a in series connection in the circuit, whereas in FIG. 1 the potential across the resistive element $R_3$ was used as the signal representative of the logarithm of the reciprocal of the ionization content. It is necessary in the circuit of FIG. 3a that the resistance of the ammeter be low compared to the combined resistances $R_1$, $R_2$, and $R_3$ or the resistance of $R_3$ must be reduced accordingly to maintain $i_2$, representative of the logarithm of $1/K_w$.

Figure 3B:
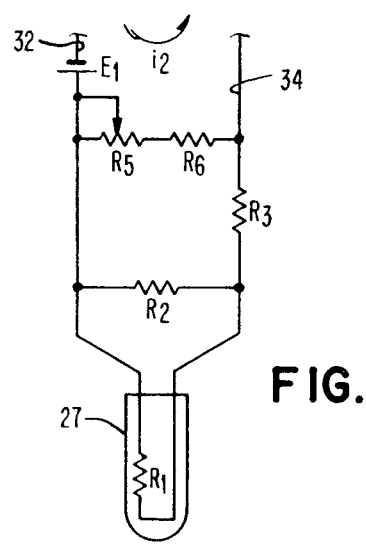

When the resistance values of the elements $R_1$, $R_2$, and $R_3$ cannot be chosen to give precisely the desired values for the current $i_2$, a trimming circuit can be added to the circuit of FIG. 3a. The resulting circuit is shown in FIG. 3b where the trimming circuit is shown as potentiometer $R_5$ and a resistor $R_6$ in series with $R_5$. This series combination of $R_5$ and $R_6$ is placed in shunt with the circuit branch containing $R_1$, $R_2$, and $R_3$. By varying the setting of the variable tap of $R_5$, the total current $i_2$ can be varied as necessary to match the curve of FIG. 2.

A set of values for the elements of the circuit of FIG. 3b, which have been used experimentally and found to be satisfactory, are as follows:

$R_1$ = 10,500 ohms at 25° C with a positive temperature coefficient of 0.0067.
$R_2$ = 12,700 ohms
$R_3$ = 1,630 ohms
$R_5$ = 200,000 ohms (set, for example, to give a net resistance of 40,000 ohms).
$R_6$ = 80,000 ohms Since the resistance of $R_1$ at a particular temperature as well as its temperature coefficient will normally not be precisely of the desired value and since the current $i_2$ must be in the proper range to relate to $i_1$ from the pH meter, it will frequently be found desirable to utilize the trimming circuit.

For a further description of this invention reference should be made to the article, "Hydroxyl Ion Measurement with the Glass Electrode," by the present inventor and a coworker, W. T. Ott, published by the Instrument Society of America in Analysis Instrumentation, Vol. 7, pp. 66–73.

What is claimed is:

1. A system for measuring the pOH value of an aqueous solution comprising
    means for producing a first signal representative of the pH of the solution,
    means responsive to the temperature of the solution for producing a second signal proportional to the value of a logarithmic function of the ionization constant of water at the solution temperature, and
    means operable to algebraically sum said first signal and said second signal to produce a third signal representative of the pOH of the solution.

2. A system as set forth in claim 1 in which the first and second signals are voltages and said logarithmic function is the logarithm of the reciprocal of the ionization constant of water.

3. A system as set forth in claim 2 in which the means for producing the second signal includes
    a source of potential, a first resistive element in series with said source and having a resistance value variable in response to changes in the solution temperature, a second resistive element in shunt with said first resistive element, and a third resistive element in series circuit with said source and the shunt combination of said first and second elements.

4. A system as set forth in claim 1 in which the value of the logarithmic function varies continuously with solution temperature substantially in accordance with the relationship $\log(1/K_w) = (4472/T) - 6.0888 + 0.017064T$, where $T$ is the absolute temperature of the solution.

5. A system as set forth in claim 1 in which the first and second signals are electrical currents.

6. A system as set forth in claim 5 in which the means for producing the second signal includes a source of potential, a first resistive element in series with said source and having a resistance value variable in response to changes in the solution temperature, a second resistive element in shunt with said first resistive element, and a third resistive element in series with said source and the shunt combination of said first and second elements.

7. A method for automatically measuring the pOH value of an aqueous solution comprising the steps of automatically producing a first signal representative of the pH of the solution, automatically producing a second signal proportional to the value of a logarithmic function of the ionization constant of water at the solution temperature, and automatically algebraically summing said first signal and said second signal to produce a third signal representative of the pOH of the solution.

8. The method set forth in claim 7 in which the production of the second signal is substantially in accordance with the relationship $\log(1/K_w) = (4472/T) - 6.0888 + 0.017064T$, where $T$ is the absolute temperature of the solution.

9. A system for measuring the pOH value of an aqueous solution subject to changes in temperature comprising means for producing a first signal representative of the pH of the solution and compensated for the temperature of the solution over the expected range of solution temperatures, means responsive to the temperature of the solution for producing a second signal representative of the value of the logarithm of the reciprocal of the ionization constant of water at the solution temperature, and means operable to subtract said first signal from said second signal to produce a third signal representative of the pOH of the solution.

10. A system for measuring the pOH value of an aqueous solution subject to changes in temperature comprising means for producing a first signal representative of the pH of the solution and compensated for the temperature of the solution over the expected range of solution temperatures, means responsive to the temperature of the solution for producing a second signal representative of the value of the logarithm of the ionization constant of water at the solution temperature, and means operable to algebraically sum said first signal and said second signal to produce a third signal representative of the pOH of the solution.

11. A method for automatically measuring the pOH value of an aqueous solution subject to changes in temperature comprising the steps of automatically producing a first signal representative of the pH of the solution and compensated for the temperature of the solution, automatically producing a second signal in response to the temperature of the solution and representative of the value of the logarithm of the ionization constant of water at the solution temperature, and automatically producing a third signal by algebraically summing said first and second signals, said third signal being representative of the pOH of the solution.

* * * * *